(12) United States Patent
Ito et al.

(10) Patent No.: US 6,628,600 B1
(45) Date of Patent: Sep. 30, 2003

(54) DISC CHANGER

(75) Inventors: Hideo Ito, Tokorozawa (JP); Yuji Morita, Tokorozawa (JP); Kenjiro Oizumi, Tokorozawa (JP); Katsuhiro Onodera, Tokorozawa (JP); Masamitsu Ohkawara, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/631,965

(22) Filed: Aug. 3, 2000

(30) Foreign Application Priority Data

Aug. 6, 1999 (JP) ............................................ 11-224299

(51) Int. Cl.[7] .............................................. G11B 17/04
(52) U.S. Cl. ................................................. 369/178.01
(58) Field of Search ........................... 369/178, 178.01, 369/258, 36, 38, 30.98, 30.7, 30.8, 30.85, 30.9, 30.72, 30.78, 30.67, 30.87; G11B 17/22

(56) References Cited

U.S. PATENT DOCUMENTS

| | | | | |
|---|---|---|---|---|
| 4,654,840 A | * | 3/1987 | Takahashi | 369/75.2 |
| 5,515,356 A | * | 5/1996 | Lee | 369/178 |
| 5,726,828 A | * | 3/1998 | Kakuta et al. | 360/98.01 |
| 5,757,740 A | * | 5/1998 | Osada | 369/36 |
| 5,812,510 A | * | 9/1998 | Son | 369/75.2 |
| 5,870,360 A | * | 2/1999 | Ito et al. | 369/30.85 |
| 5,878,016 A | * | 3/1999 | Kubokawa et al. | 369/30.85 |
| 5,903,538 A | * | 5/1999 | Fujita et al. | 369/192 |
| 6,091,696 A | * | 7/2000 | Miyoshi et al. | 369/192 |
| 6,151,279 A | * | 11/2000 | Ikedo et al. | 369/30.98 |
| 6,246,643 B1 | * | 6/2001 | Satoh et al. | 369/38 |
| 6,396,794 B1 | * | 5/2002 | Tsugami et al. | 369/178.01 |

* cited by examiner

Primary Examiner—George J. Letscher
(74) Attorney, Agent, or Firm—Nixon & Vanderhye

(57) ABSTRACT

A disc changer comprises a receiving unit for receiving a plurality of discs, a base unit, a playback unit and a transfer unit for transferring one of the plurality of discs to the playback unit. The transfer unit is movable in the perpendicular direction to the base unit. The playback unit has on its opposite ends swing support axes. The playback unit is swingable around the swing support axes relative to the base unit and the transfer unit, respectively. The playback unit has a gear. The base unit has a base unit-gear segment portion and the transfer unit has a transfer unit-gear segment portion. The gear is held between the base unit-gear segment portion and the transfer unit-gear segment portion so as to engage with these gear segment portions.

9 Claims, 7 Drawing Sheets

SELECTION OPERATION (LINEAR)

SELECTION OPERATION (LINEAR)

DISC CHANGER

BACKGROUND OF THE INVENTION

1. Field of the Invention

The present invention relates to a disc changer, in which a desired record medium is selected from record media such as magnet-optical disc, optical discs or the like that are received in a magazine or the like, and a record or reproduction operation for the selected record medium is carried out.

2. Description of the Related Art

There has conventionally been know a disc changer, in which a desired record medium is selected from record media such as magnet-optical disc, optical discs or the like and a record or reproduction operation for the selected record medium is carried out. The disc changer has a receiving unit for receiving a plurality of discs, a playback unit for carrying out a record or reproduction operation for the disc, and a transfer unit for transferring the disc from the receiving unit to the playback unit. The receiving unit receives discs in a stacked state. The transfer unit moves vertically to a position of the prescribed disc relative to the base unit to transfer the disc from the receiving unit to the playback unit.

FIG. 7 illustrates a changer that is provided with a transfer unit 71 and a playback unit 72, which are formed independently. In the changer, the receiving unit 73 and the playback unit 72 are placed on the base unit 74. The transfer unit 71 locates above the playback unit so as to move vertically.

The transfer operation of the disc from the receiving unit 73 to the playback unit 72 is carried out in the following manner. First, the transfer unit 71 moves linearly to a position of the prescribed disc. The prescribed disc is pulled from the receiving unit 73 into the transfer unit 71 and the transfer unit 71 moves down to place the disc on the playback unit 72.

FIG. 8 illustrates an example of the changer in which the playback unit is integrally formed with the transfer unit. In such an example, the transfer unit and the playback unit, which are integrally formed with each other, move up to a position of the prescribed disc, pulls the prescribed disc from the receiving unit 75 and to transfer it to the playback unit 76. Then, a playback operation in the playback unit 76 starts.

However, in any one of the conventional changers described above, a selection operation in which the transfer unit moves vertically to a position of the prescribed disc is carried out so that the linearly vertical movement is made, while maintaining a parallel posture of the transfer unit with the base unit. With respect to an elevation mechanism for moving vertically the transfer unit, guide shafts are provided on the base unit so as to project upward and the transfer unit is guided by means of these guide shafts so as to be movable linearly. The vertical movement of the transfer unit is caused by a rack and pinion mechanism. Such an elevation mechanism in which the linearly vertical movement is made, while maintaining the parallel posture of the transfer unit with the base unit, requires enlarged structural elements and leads to the complicated structure.

The ejection operation for discharging the disc from the disc changer is carried out for each of the discs received in the receiving unit. It is therefore necessary to provide an ejection mechanism for each of the leading to the complicated structure.

The selection operation and the ejection operation are carried out by the separate driving power sources. Provision of the plurality of driving power sources makes the entire structure complicated.

SUMMARY OF THE INVENTION

An object of the present invention is therefore to provide a disc changer, which has a simple structure by which an ejection operation and a selection operation can be carried out.

In order to attain the aforementioned object, in the present invention, an selection operation is carried out so as to make an up and down movement not along a straight line, but along a curve for approximation to the straight line, while maintaining a parallel posture of the transfer unit with the base unit or the similar posture thereto, within a range in which the disc is pulled out of the receiving unit. More specifically, the disc changer of the present invention comprises:

a receiving unit for receiving a plurality of discs;

a base unit;

a playback unit; and a transfer unit for transferring one of said plurality of discs to said playback unit, said transfer unit being movable in a perpendicular direction to said base unit, wherein:

said playback unit has on its opposite ends swing support axes, said playback unit being swingable around said swing support axes relative to said base unit and said transfer unit, respectively, said playback unit having a gear;

said base unit has a base unit-gear segment portion and said transfer unit has a transfer unit-gear segment portion, said gear being held between said base unit-gear segment portion and said transfer unit-gear segment portion so as to engage with these gear segment portions.

According to the feature of the present invention, the one end of the transfer unit is supported by engagement of the transfer unit-gear segment portion with the gear provided on the playback unit and the other end of the transfer unit is supported by one of the swing support axes of the playback unit. The swing of the playback unit relative to the base unit causes the transfer unit to move substantially linearly, while maintaining substantially the parallel posture of the transfer unit with the base unit. The selection operation can therefore be carried out by a simple structure.

In the other disc changer of the present invention, the receiving unit for receiving the plurality of discs moves horizontally relative to the base unit to discharge simultaneously all the discs. The structure of the disc changer for making the ejection operation can be simplified. The ejection operation and the selection operation are carried out by the single driving power source in order to obtain the disc changer having the simpler structure. More specifically, the disc changer of the present invention comprises:

a receiving unit for receiving a plurality of discs;

a base unit; and a transfer unit being movable in a perpendicular direction to said receiving unit, wherein:

an ejection operation in which said receiving unit slides in a horizontal direction relative to said base unit and a selection operation in which said transfer unit moves to a prescribed position of one of said plurality of discs are carried out by a single driving power source. The relative movement of the transfer unit may include the movement of the transfer unit relative to the receiving unit and the movement of the receiving unit relative to the transfer unit.

According to the features of the present invention, the single driving power source for the ejection operation and the selection operation makes the structure of the disc changer simple. It is also possible to manufacture the disc changer in a smaller size.

In the first disc changer of the present invention, an ejection operation in which said receiving unit slides in a horizontal direction relative to said base unit and a selection operation in which said transfer unit moves to a prescribed position of one of said plurality of discs may be carried out by a single driving power source.

According to such a feature, the selection operation can be conducted by a simple structure. The single driving power source for the ejection operation and the selection operation makes the structure of the disc changer simple.

The first disc changer of the present invention may further comprise a cam device, which swings said playback unit relative to said base unit and slides said receiving unit in the horizontal direction relative to said base unit.

According to such a feature, the cam device causes the playback unit to swing relative to the base unit and the transfer unit moves perpendicularly to the base unit. The receiving unit slides horizontally relative to the base unit utilizing an overstroke of the cam device. Accordingly, the selection operation and the ejection operation can be carried out by a simpler structure.

In the first disc changer of the present invention, there may be adopted a structure that said playback unit has a wedge portion that is capable of projecting, said cam device causing said wedge portion to project to engage with said base unit so as to restrict a swing motion of said playback unit.

According to such a structure, it is possible to prevent the playback unit from swinging during transportation of the disc changer by projecting the wedge portion from the playback unit.

In the first disc changer of the present invention, there may be adopted a structure that there is provided a pawl for maintaining a prescribed swing angle of said playback unit relative to said base unit so that an assembly operation can be carried out, while keeping said transfer unit substantially in parallel with said base unit.

According to such a structure, when the base unit and the playback unit are assembled during an assembly operation, the playback unit is placed on the pawl so as to maintain a prescribed swing angle of the playback unit relative to the base unit. The gear provided on the playback unit engages with the base unit-gear segment portion at a prescribed position. When the playback unit is combined with the transfer unit, the transfer unit-gear segment portion is placed on a prescribed position of the gear of the playback unit. When the pawl is removed, the playback unit swings-so that the gear of the playback unit engages with the transfer unit-gear segment portion and the base unit-gear segment portion. As a result, the assembly operation can be carried out, while maintaining substantially a parallel posture of the transfer unit relative to the base unit.

DETAILED DESCRIPTION OF THE PREFERRED EMBODIMENTS

Now, embodiments of a disc changer the present invention will be described in detail below with reference to the accompanying drawings.

Figure 1:
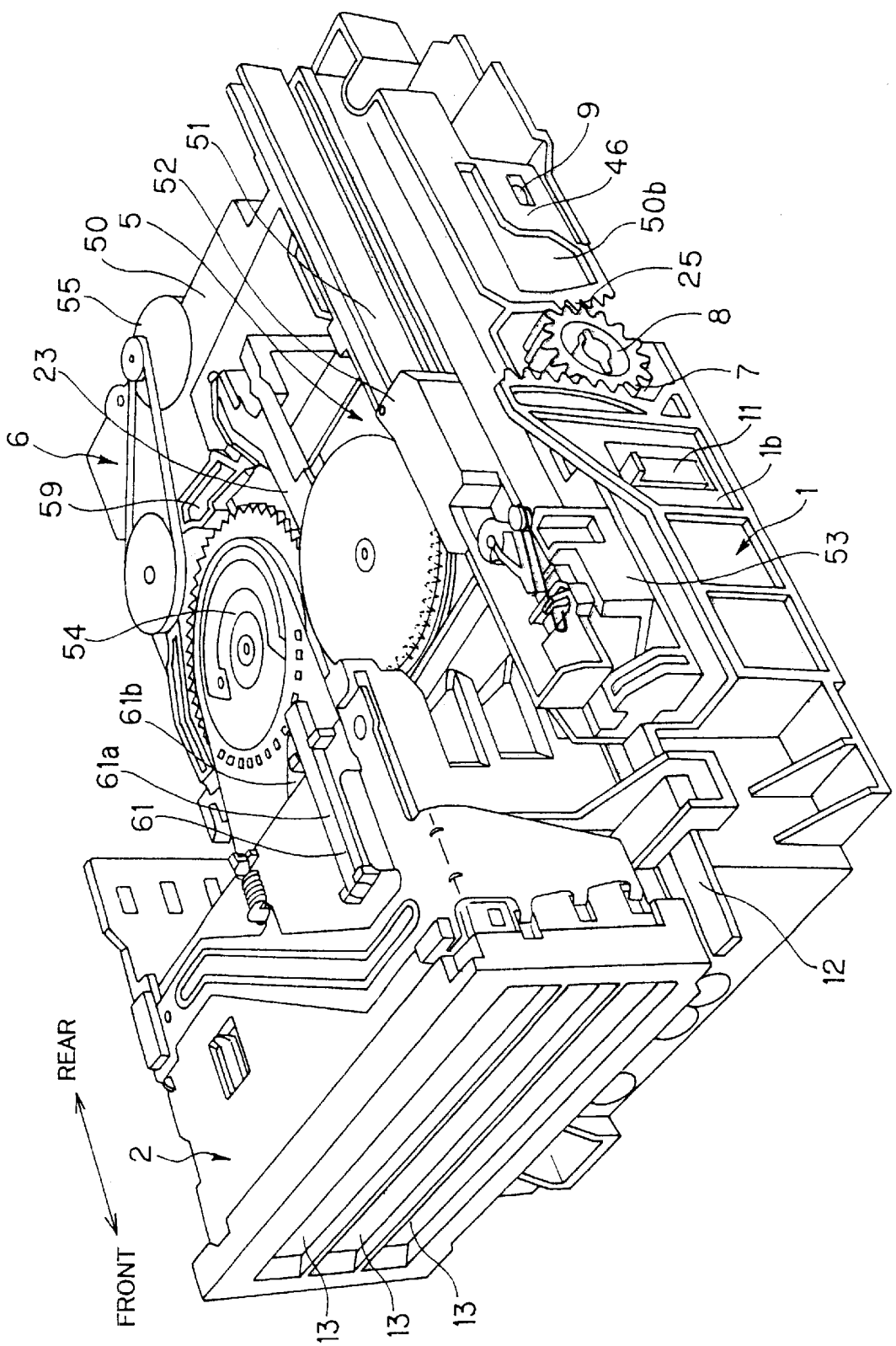
FIG. 1 is a perspective view illustrating a disc changer of the first embodiment of the present invention.
Figure 2:
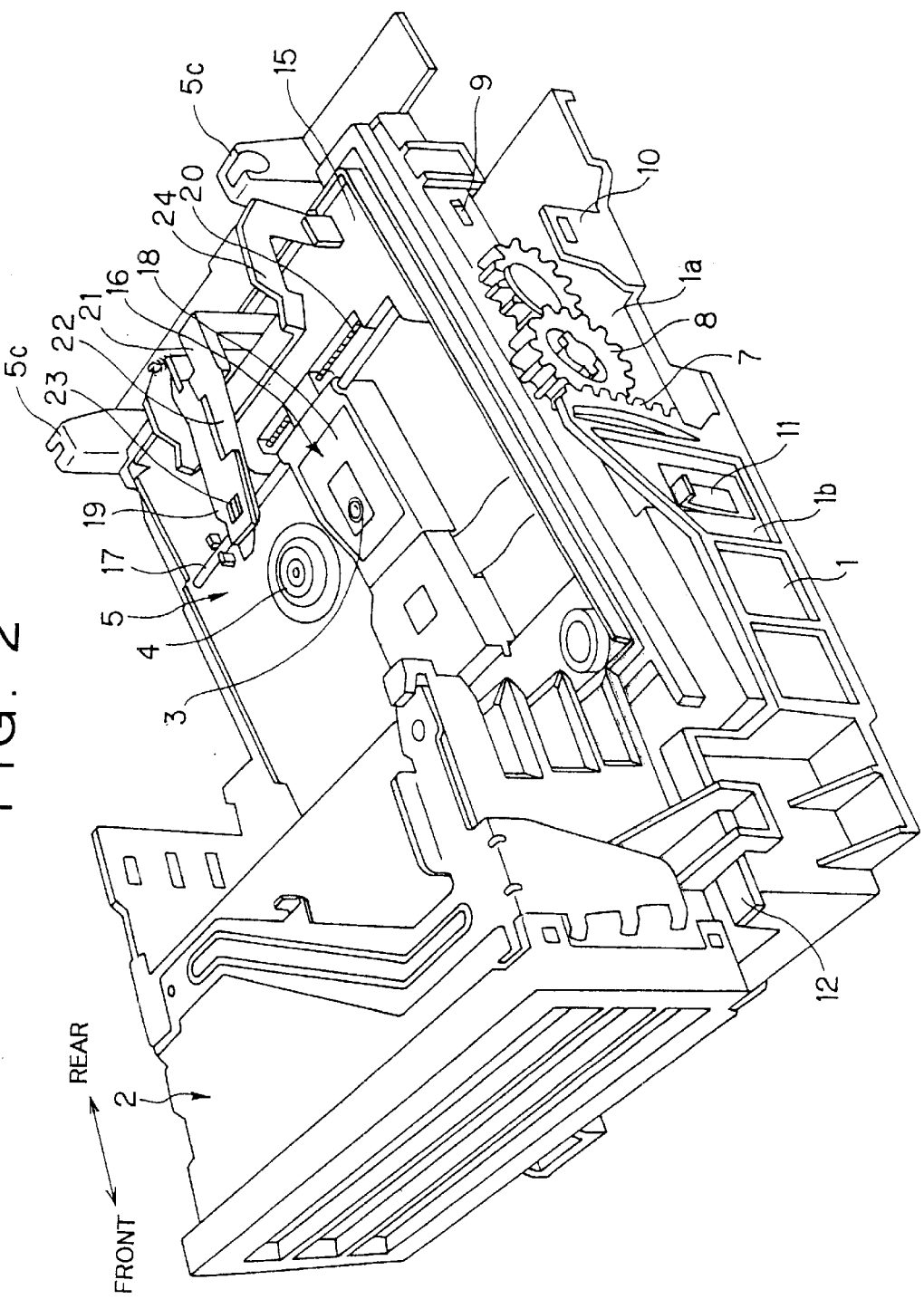
FIG. 2 is a perspective view illustrating the state in which a transfer unit is removed from the disc changer as shown in FIG. 1.

FIGS. 1 and 2 are perspective views illustrating the disc changer of the embodiment of the present invention. The disc changer is used as a changer for mini discs (MD) (hereinafter simply referred to as the "discs"), each of that has a cartridge into which the disc is received. The disc changer comprises a base unit 1, a receiving unit 2 for receiving a plurality of discs, for example, three discs, a playback unit 5 for reproducing information of the disc and a transfer unit 6 for transferring the disc received in the receiving unit 2 to the playback unit 5. FIG. 1 is a perspective view illustrating the disc changer into which the base unit 1, the playback unit 5, the receiving unit 2 and the transfer unit 6 are assembled. FIG. 2 illustrates the state in which the transfer unit 6 is removed from the assembled units to show the playback unit 5 locating below the transfer unit 6.

As shown in FIG. 2, the base unit 1 has a bottom plate 1a having a rectangular shape and side walls 1b provided on the opposite side edges of the bottom plate 1a. Each of the side walls 1b extends from the front edge of the base unit 1 to its middle portion. The side wall 1b is provided at its front end with a bearing 1c for supporting the rotation shaft 5b of the playback unit 5 (see FIG. 3) so that the playback unit 5 can swing around the rotation shaft 5b. The side wall 1b has a gear-segment portion 7 formed at the rear end of the side wall 1b. The gear-segment portion 7 engages with a gear 8 provided on the playback unit 5. The central axis of the gear-segment portion 7 coincides with the central axis of the rotation shaft 5b of the playback unit 5 so that the playback unit 5 can swing while maintaining the engagement of the gear 8 with the gear-segment portion 7. The side wall 1b is provided with a pawl 11 so that the assembly operation can be carried out, while maintaining substantially the parallel posture of the transfer unit 6 relative to the base unit 1. The pawl 11 is flexible. The peak portion of the pawl 11 supports the bottom of the playback unit 5 so as to maintain a prescribed swing angle of the playback unit 5 relative to the base unit 1. The prescribed swing angle is determined to be larger than the swing angle of the playback unit 5 during the selection operation. Engagement of the pawl 11 with the playback unit 5 is released during the selection operation.

The receiving unit 2 is placed on the side walls 1b of the base unit 1 so as to be slidable in the longitudinal direction of the disc changer. Each of the side walls has a guide rail 12 that extends in the longitudinal direction of the disc changer to guide the receiving unit 2.

The base unit 1 has wedge-receiving walls 10 formed on the opposite edges of the rear of the base unit 1. Each of the wedge-receiving walls 10 has a hole that has a corresponding shape to a wedge portion 9 projecting from the playback unit 5. The wedge portion 9 is fitted into the hole of the wedge-receiving wall 10.

The receiving unit 2 has three slots 13 so that three discs can be stored in a stacking state in the vertical direction. Each of the slots 13 is provided with a retaining member having a leaf-spring shape for retaining the disc. When the disc is inserted into the slot 13 to reach a prescribed position, the retaining member is fitted into a hole formed on a shutter that is provided on the side of the disc, so as to retain the disc in the prescribed position. The receiving unit 2 is provided with a positional restriction lever 61 for preventing the disc from being inserted to move beyond the prescribed position. The positional restriction lever 61 is composed of a rotatable shaft 61a that is rotatably supported on the upper surface of the receiving unit 2 and a restriction bar 61b extending from the rotatable shaft 61a so as to intersect the slot 13 at its rear end. The positional restriction lever 61 can swing along with the upward or downward movement of the transfer unit 6 so as to ensure a space in which the disc can be pulled from the receiving unit 2 into the transfer unit 6. playback unit 5 to make record or reproduction of information is swingably mounted on the base unit 1. The playback unit 5 comprises a playback base 15 having a rectangular shape, a spindle motor driving system 4 for driving the disc to rotate, a pickup driving system 16 on which an optical pickup 3 for reading information recorded on the disc is mounted, and a magnetic recording head system 19 for applying magnetic field modulation to the disc 60 as shown in FIG. 2.

The spindle motor driving system 4 is a well-known mechanism having a spindle-driving motor and a turntable that is directly connected to the rotation shaft of the spindle-driving motor.

The pickup driving system 16 is a well-known mechanism that is composed of a guide shaft 17 secured on the playback base 15, a pickup 3 guided by the guide shaft so as to be linearly movable, and a driving mechanism 20 for reciprocating the pickup 3. A pickup-driving motor causes, in cooperation with such a pickup driving system 16, the pickup 3 to move in the diametrical direction of the disc.

The magnetic head system 19 is obtained by providing a leaf spring 22 on a stay 21 projecting from the pickup 3, and providing the magnetic head 23 on the front end of the leaf spring 22. There is provided below the magnetic head a head-moving lever 24 for warping upward the leaf spring 22, so as to be swingable. The head-moving lever 24 swings so that the magnetic head 23 comes into contact with the disc during the recording mode for the disc and to withdraw from the disc during the reproduction mode. The head-moving lever 24 is swung by means of a cam device (not shown) provided in the transfer unit 6.

Figure 3:
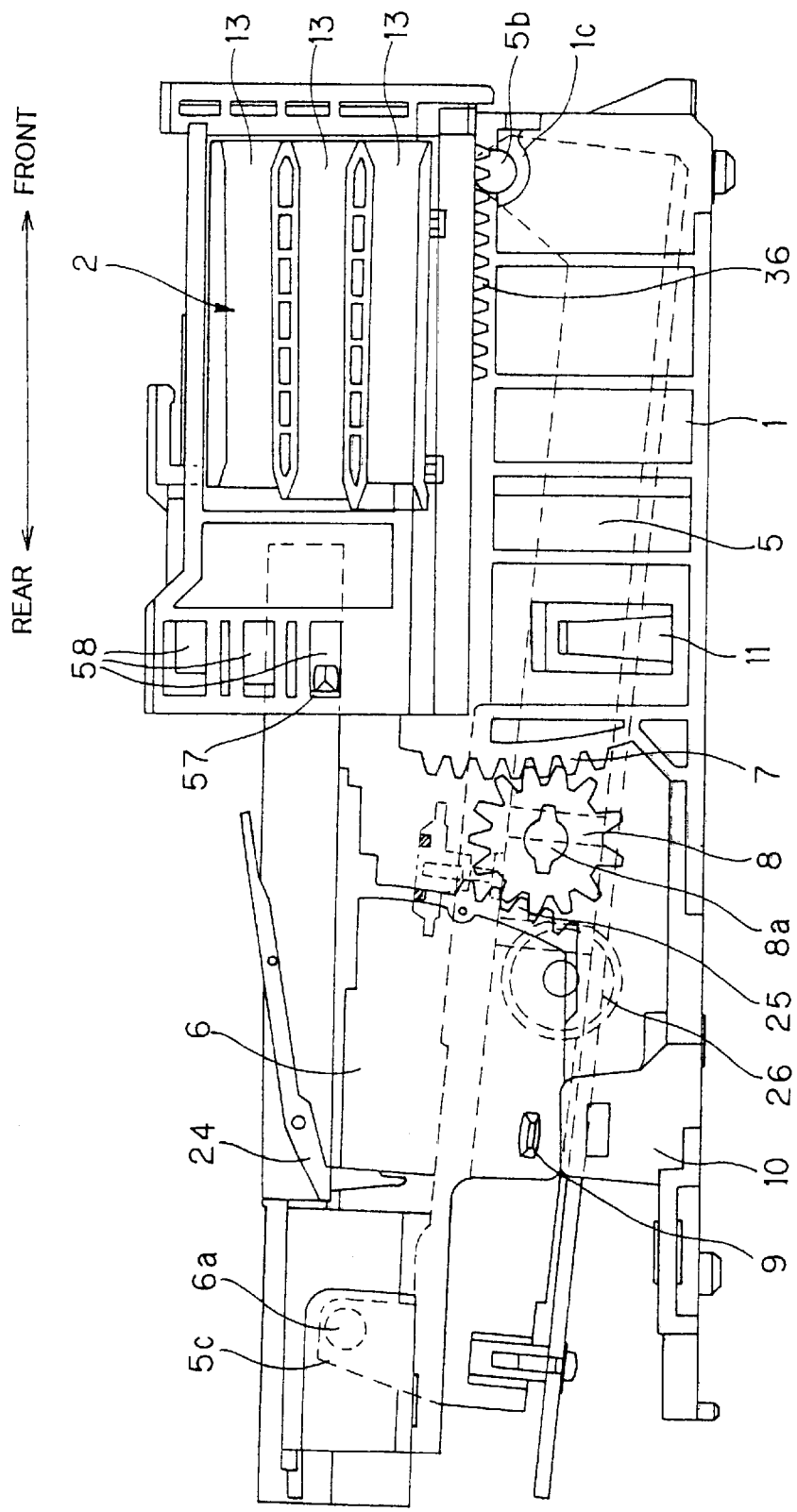
FIG. 3 is a side view illustrating the disc changer as shown in FIG. 1.

The playback unit 5 has on its opposite ends swing support points 5b, 5c that are pivotably connected to the base unit 1 and the transfer unit 6, respectively, as shown in FIG. 3. More specifically, the playback unit 5 is provided at its front end with a swing support shaft 5b, which is supported by the bearing 1c of the base unit 1. As a result, the playback unit 5 can swing relative to the base unit 1 around the swing support shaft 5b. The playback unit 5 is provided at its rear end with the bearing 5c, which supports a swing support shaft 6a of the transfer unit 6. As a result, the transfer unit 6 can swing relative to the playback unit 5 around the swing support shaft 6a. The playback unit 5 is provided on the opposite side surfaces of its central portion with gears 8, which are rotatably supported by shafts 8a so as to engage with the gear-segment portions 7 of the base unit 1 and the transfer-unit gears 25. The gears 8 also engage with synchronization gears 26 provided on the opposite side surfaces of the playback unit 5. The synchronization gears 26 are fixed to the opposite ends of a shaft so as to rotate integrally with each other. Accordingly, the pair of gears 8 also rotates in the same velocity.

Figure 4:
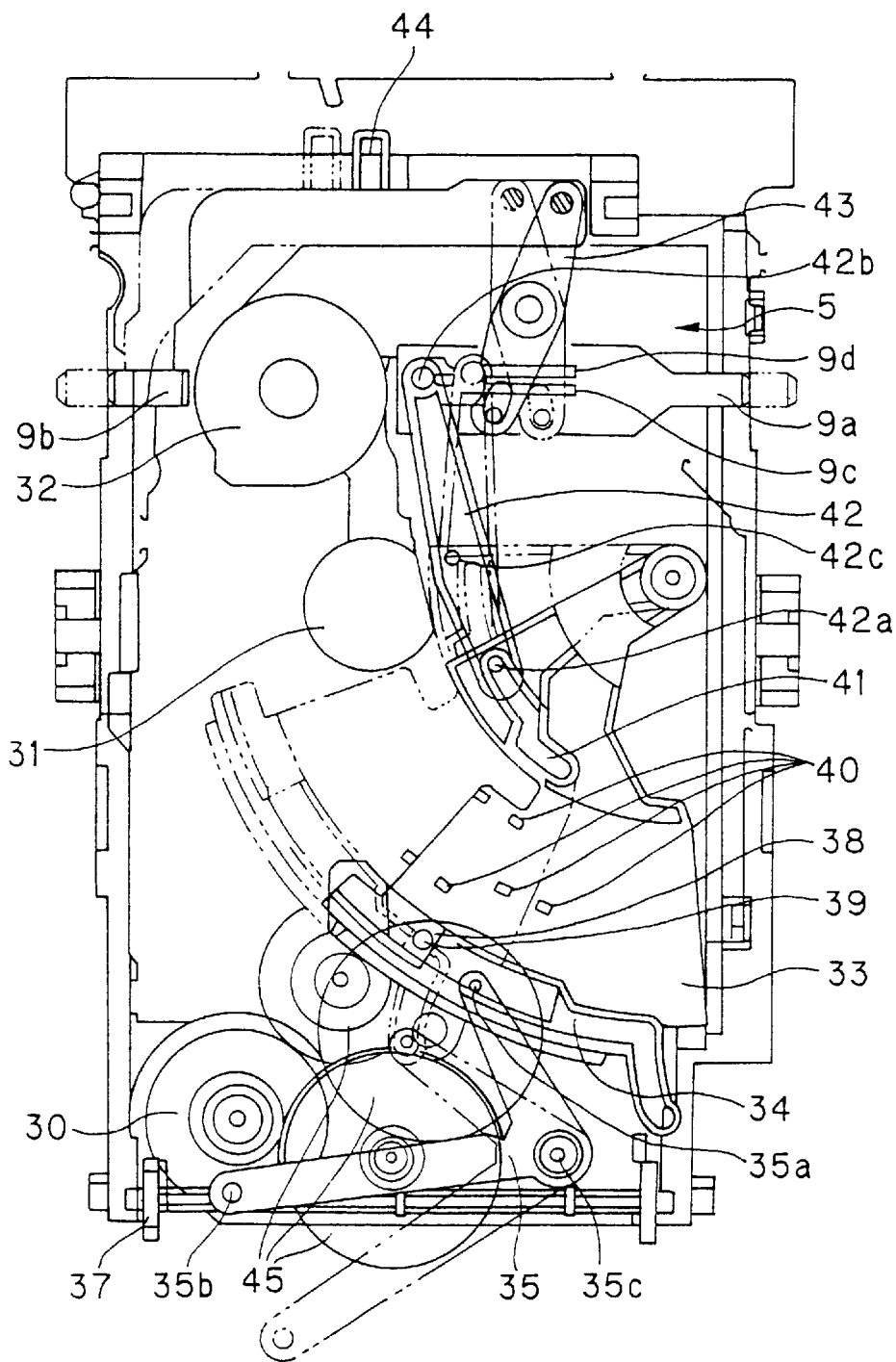
FIG. 4 is a plan view illustrating the lower portion of the playback unit.

FIG. 4 is a plan view illustrating the lower portion of the playback unit. The playback unit has three motors serving as the driving source. The first is a spindle-driving motor 31 for rotating the above-mentioned turntable 4, the second is a pickup driving motor 32 for driving the above-mentioned pickup 3 and the third is a playback unit-cam driving motor 30 for swinging a cam 33 provided on the playback unit. When the playback unit-cam driving motor 30 is driven, the rotational velocity of it is reduced by a gear train 45 and the cam 33 having on the outer periphery the gear teeth rotates. The change in the rotational direction of the playback unit-cam motor 30 causes the cam 33 to be reciprocated between two positions that are indicated by solid lines and two-dot chain lines in FIG. 4. The cam 33 as the driver and the three followers serve as kinematic pair. More specifically, the swing of the cam 33 causes ① the forward and rearward reciprocal linear movement of the receiving unit 2 relative to the base unit 1, ② the reciprocal swing motion of the playback unit 5 relative to the base unit 1 and ③ the movement of the wedge portion 9 to project or withdraw relative to the playback unit 5.

First, description will be given below of the mechanism for making the forward and rearward reciprocal linear movement of the receiving unit relative to the base 1. The cam 33 is provided with a groove 34. An ejection lever 35 having an L-shape is provided on its end with a cam engaging pin 35a, which is inserted into the above-mentioned groove 34. The swing of the cam 33 causes the cam engaging pin 35a to slide along the groove 34. Accordingly, the ejection lever 35 swings around a swing support point 35c. The reciprocal swing motion of the cam 33 causes the ejection lever 35 to be reciprocated between two positions that are indicated by solid lines and two-dot chain lines in FIG. 13. The ejection lever is provided on the other end with a receiving unit-engaging pin 35b, which is inserted into a slotted hole formed in the receiving unit 2. The swing motion of the ejection lever 35 causes the receiving unit 2 to linearly move relative to the base unit 1. The receiving unit 2 is provided on its under surface with a pair of racks 36 extending in the horizontal direction (see FIG. 3). The racks 36 engage with synchronization pinions 37 pivotably supported on the playback unit 5. According to such a structure, it is possible to maintain the balance of the receiving unit 2 at the right and left-hand sides when the receiving unit 2 moves forward or rearward.

Figure 6:
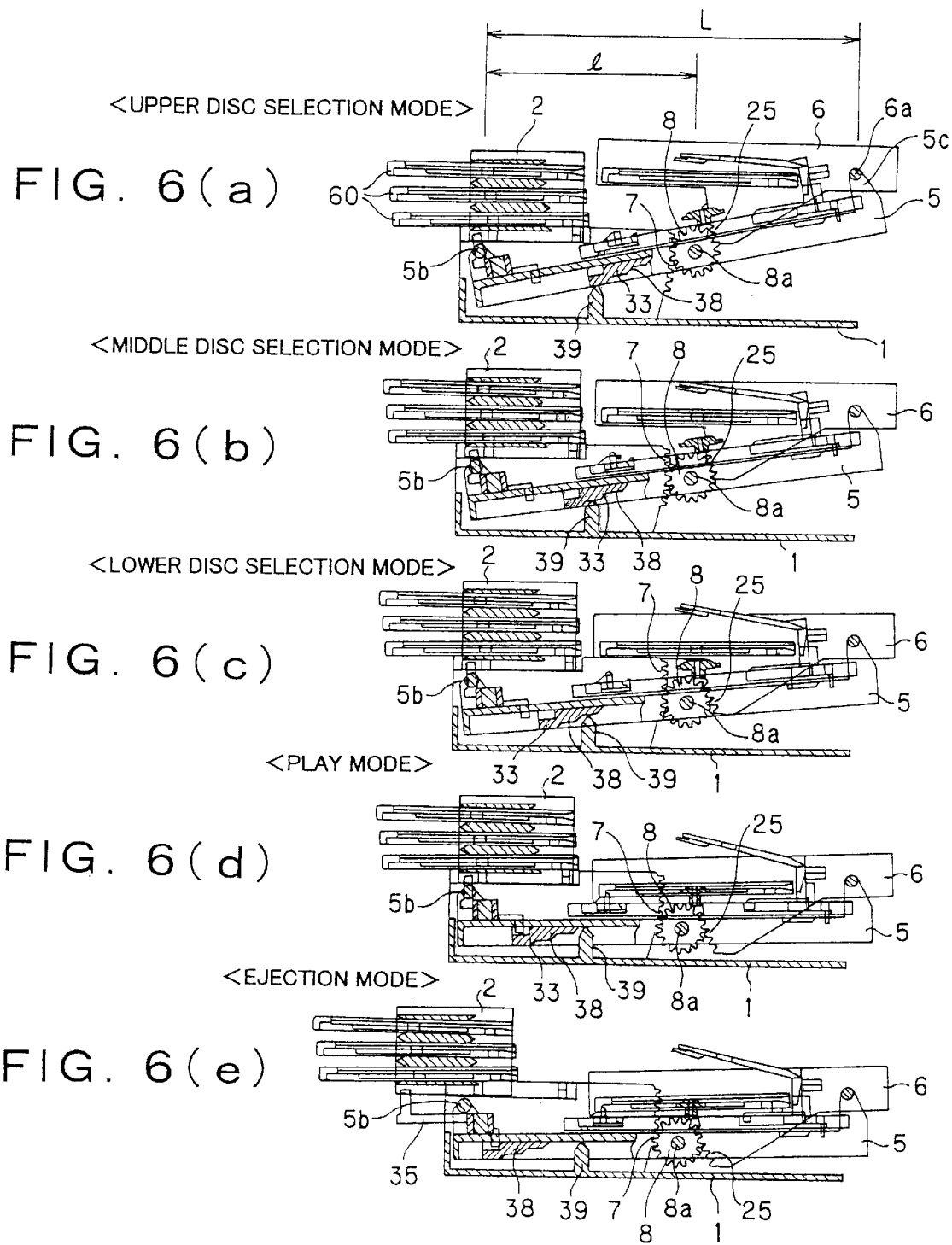
FIG. 6 is a view illustrating principle of mechanical operation of the disc changer.
Figure 7:
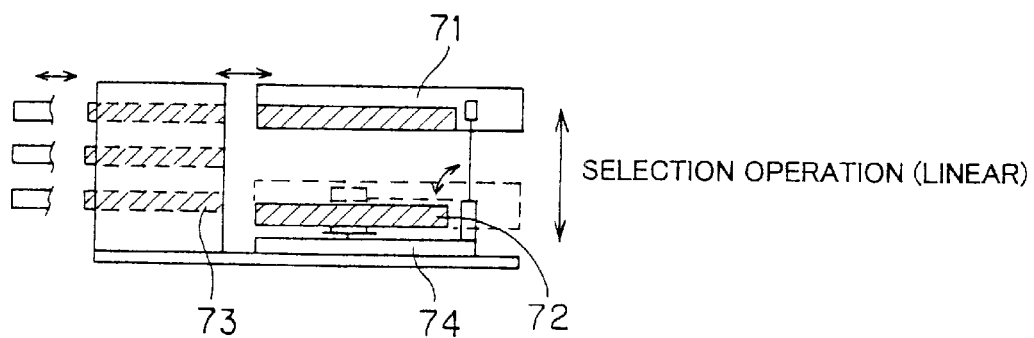
FIG. 7 is a side view illustrating the conventional disc changer.
Figure 8:
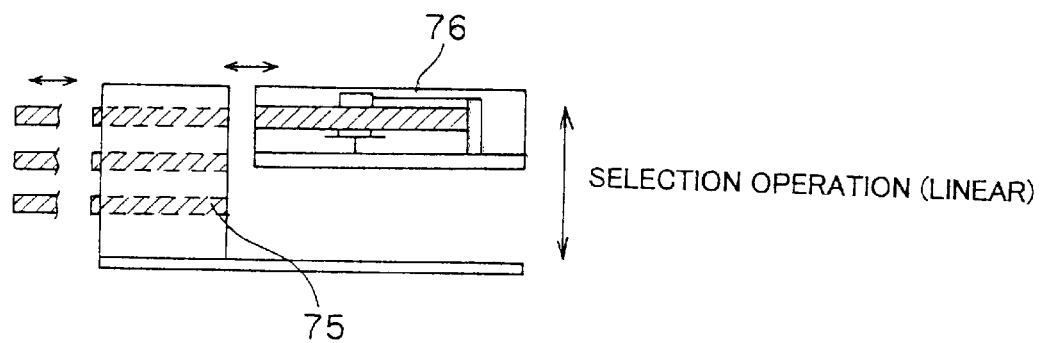
FIG. 8 is a side view illustrating the other conventional disc changer.

Then, description will be given below of the mechanism for making the reciprocal swing motion of the playback unit 5 relative to the base unit 1. The cam 33 has a stair portion 38 with three steps. The stair portion is placed on a pin 39 projecting from the base unit 1 in a perpendicular direction to the cam 33 (see FIG. 6). When the cam 33 swings, it runs on the pin 39 as the sequential first to third steps (see FIG. 6). The playback unit 5 to which the cam 33 is mounted, swings per se at the three stages. In order to ensure a prescribed swing angle of the playback unit 5, it is necessary to cause the cam 33 to stop when the pin 39 reaches the landing of the stair portion 38. In view of this fact, there are provided three switches 40 for detecting the swing angle of the cam 33.

Then, description will be given below of the mechanism for moving the wedge portion 9 to project or withdraw relative to the playback unit 5. The cam 33 is provided on its middle portion with a groove 41, into which a cam engaging pin 42a provided on the one end of a link 42 is inserted. The reciprocal swing motion of the cam 33 causes the link 42 to swing around the swing support point 42c from the position indicated in the solid lines to the position indicated in the two-dot chain lines in FIG. 13. The wedge portion 9a is provided on the other end of the link 42 so as to serve as revolute pair. The swing of the link 42 causes the wedge portion 9a to project or withdraw from the playback unit 5. A line 43 is provided also between the wedge portion 9a and the wedge portion 9b to serve as revolute pair so that the wedge portions 9a, 9b can project or withdraw in a bilaterally symmetrical manner. Each of the wedge portions 9a, 9b has a tapered tip end that is fitted into a fitting hole formed on the wedge-side wall 10 of the base unit 1 and another fitting hole formed on the other wedge-side wall 46 (see FIG. 1) of the transfer unit 6. In case of no provision of a wedge portion 9, when the disc changer is placed upside down, the playback unit 5 may swing, with the result that an element between the transfer unit 6 and the base unit 1 expands and contracts like an accordion. Accordingly, the element between the transfer unit 5 and the base unit 1 may be kept in an expanded state when the disc changer is transported. It is however possible to kept the playback unit 5 and the transfer unit 6 in their appropriate positions relative to the base unit 1 by providing the wedge portions 9a, 9b that can project from the playback unit 5. The pin 42b of the link 42, which locates in the wedge portion 9a side, is fitted into a groove 9c formed on the wedge portion 9a. The pin 42b is resiliently pressed by the tip end of a leaf spring 9d that divides the groove 9c into two. The link 42 and the wedge portion 9a serve as revolute pair during a normal operation. A knob 44 provided on the wedge portion 9b is slid manually in the right or left-hand direction in a deformed state of the leaf spring 9d, the resilient pressure that is applied to the pin 42b by the leaf spring 9d is released and the pin 42d moves into the groove 9c. Accordingly, it is possible to cause the wedge portion to project or withdraw, thus leading to an easy assembly.

The transfer unit 6 for pulling the disc from the receiving unit 2 is provided with a load base 50, a transfer rail 51 integrally formed with the side surface of the load base 50, a transfer plate 52 that is slidable along the transfer rail 51, a transfer lever 53 mounted swingably on the transfer plate 52 and a driving mechanism 54 for driving the transfer plate 52. Drive of the transfer unit-driving motor 55 of the driving mechanism 54 causes the transfer plate 52 to slide along the transfer rail 51. The transfer lever 53 is fitted into the fitting hole of the disc so as to pull the disc in the inside of the changer.

The load base 50 is provided at its rear end with a rotation shaft 6a that is supported by a bearing 5c of the playback unit 5 (see FIG. 3) so that the transfer unit 6 can swing relative to the playback unit 5. The load base 50 is also provided at the opposite side edges with the side walls 50b. The side wall 50b has a transfer-unit gear 25, which engages with the gear 8 provided on the playback unit 5. The transfer-unit gear 25 is formed as the gear-segment portion having the central axis that coincides with the central axis of the rotation shaft 6a. The gear 8 that is provided on the playback unit 5 is held between the transfer-unit gear 25 and the gear-segment portion 7 of the base unit 1 (i.e., the base-unit gear 7). The side wall 50b also has a hole into which the wedge portion 9 is fitted.

The transfer unit 6 has a cam device (not shown), which operates by the drive of the transfer unit-driving motor 55. The cam device has the following three operational modes.

① The pawl 57 projects from the side of the transfer unit 6 (see FIG. 3). The pawl 57 is fitted into any one of positional determination openings 58 that are provided so as to correspond to the slots 13. When the transfer unit 6 is lifted to a prescribed level in accordance with instructions of a user, the transfer unit-driving motor 55 operates to project the pawl 57 so as to make a positional determination of the transfer unit 6 in the vertical direction. The pawl 57 has a tapered tip end. The pawl 57 can be fitted into the positional determination opening 58 even when the transfer unit 6 locates in a position, which is slightly different from the prescribed position.

② The magnetic head 23 moves vertically. The drive of the transfer unit-driving motor 55 causes the magnetic head 23 to approach the disc during the recording mode for the disc and to withdraw from the disc during the reproduction mode. The drive of the transfer unit-driving motor 55 causes a head-moving cam 59 to operate to swing a head-moving lever 24.

③ The disc pulled into the transfer unit is kept in a stable state. The drive of the transfer unit-driving motor causes a leaf spring (not shown) to be elastically deformed, which is placed on the upper surface of the disc. The disc is pressed downward. The playback unit 5 is provided with a tapered positional determination projection and a detent projection. When the transfer unit 6 is moved downward and the disc 60 is placed on a turntable of the playback unit 5, there is made a positional determination to place the cartridge of the disc 60, to which a downward resilient force is applied by means of the leaf spring, in a proper position. The turntable has a polarization property and the disc received in the cartridge is kept in a proper position. The disc does not come into contact with the cartridge during rotation of the spindle. The playback unit 5 is provided with a record prevention-protrusion switch for preventing information from being recorded on the disc on which the other information has already been recorded. The protrusion switch automatically operates when a premastered disc or a disc in which a non-recordable mode is maintained by means of a write inhibition device is placed on the playback unit 5. The leaf spring 81 locates in the vicinity of the protrusion switch in order to ensure a proper operation of the protrusion switch.

In the disc changer of the present invention, the single motor, i.e., the playback unit-cam driving motor 30 performs an ejection operation of sliding the receiving unit 2 forward or rearward relative to the base unit 1 to eject simultaneously the plurality of discs, for example, three discs as well as a selection operation of moving the transfer unit 6 to the prescribed position for the disc 60 in the vertical direction.

Figure 5:
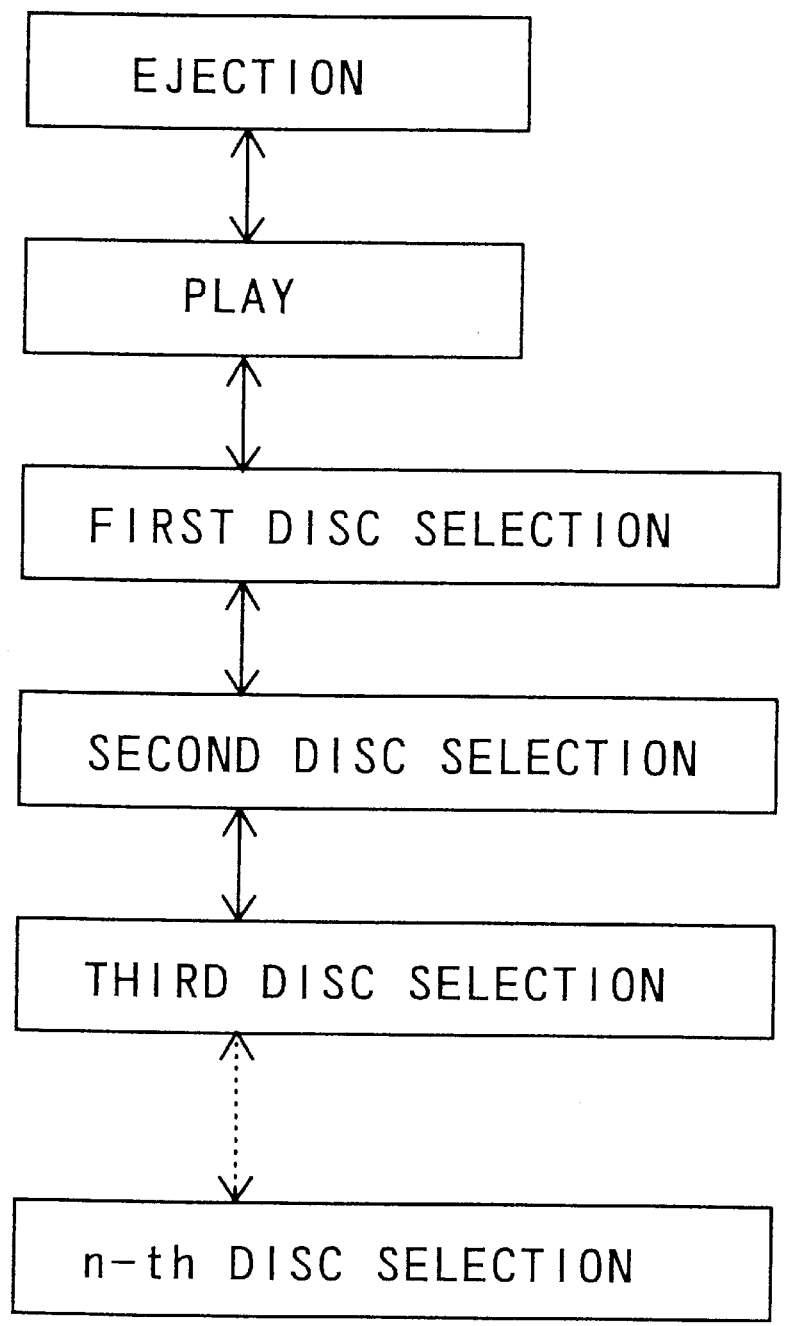
FIG. 5 is a view illustrating operation of the disc changer.

FIG. 5 illustrates operation of the disc changer. The ejection operation for the receiving unit 2 and the selection operation in which the transfer unit 6 moves up and down to the position of the prescribe disc are carried out by the operation of the cam 33 that swings by the playback unit-cam driving motor 30. It is possible to change the cartridge after completion of the ejection operation for the receiving unit 2.

FIGS. 6(a) to 6(e) illustrate principle of mechanical operation of the changer. First, the selection operation will be described. The receiving unit 2 receives three discs 60. The transfer unit 6 moves vertically so as to keep a parallel state with the base unit 1 in accordance with the position of the received disc 60. The position of the transfer unit 6 in the vertical direction can be adjusted by the stair portion 38 of the cam 33. The stair portion 38 has the three steps. The swing angle of the playback unit 5 can be adjusted at three steps by causing the cam to run on the pin 39 of the base unit 1. FIG. 6(a) illustrates an upper disc selection mode in which the transfer unit 6 locates in a position of the upper disc 60. FIG. 6(b) illustrates a middle disc selection mode in which the transfer unit 6 locates in a position of the middle disc 60. FIG. 6(c) illustrates a lower disc selection mode in which the transfer unit 6 locates in a position of the lower disc 60. FIG. 6(d) illustrates a play mode in which the transfer unit 6 locates in the lower most position. In such a play mode, reproduction process of information of the disc 60 is carried out. The cam 33 appears to slide on the playback unit 5 in FIGS. 6(a) to 6(d). The swing motion of the cam 33 is practically carried out as described above.

The gear 8, which engages with the transfer unit-gear 25 of the transfer unit 6, supports the one end of the transfer unit 6 and the bearing 5c of the playback unit 5 supports the other end (i.e., the rotation shaft 6a) of the transfer unit 6. The downward movement of the transfer unit 6 is provided by operating the stair portion 38 of the cam 33 to turn the playback unit 5 in the clockwise direction. The turn of the playback unit 5 in the clockwise direction causes the gear 8, which engages with the base unit-gear 7, to move downward while turning in the clockwise direction. The gear 8 also engages with the transfer unit-gear 25 and the turn of the gear 8 in the clockwise direction causes the transfer unit-gear 25 to move downward. As a result, the transfer unit-gear 25 moves by a distance, which is about twice as much as the moving distance of the rotation shaft 8a of the gear 8.

In the disc changer of the present invention, the ratio of the distance "l" from the swing support point 5b of the playback unit 5, which locates in the base unit side, to the rotation shaft 8a of the gear 8 relative to the distance "L" from the swing support point 5a locating in the base unit side to the swing support point 6a locating in the transfer unit side (i.e., l/L) is determined as about "1:2". As a result, the swing support point 6a of the transfer unit 6 can move downward by a distance which is about twice as much as the moving distance of the rotation shaft 8a. More specifically, the transfer unit-gear 25 and the swing support point 6a of the transfer unit 6 can move downward by the same distance so that the transfer unit 6 can move linearly, maintaining a parallel posture with the base unit 1. Under the function of the synchronization gear, the pair of gears 8 provides the same movement so as not to make different movement from each other. Consequently, the four corners of the transfer unit 6 can move downward by the same distance.

An ejection operation will be described. When the transfer unit is kept in a descent state and the playback cam driving motor 30 is driven to urn the cam 33, there occurs overstroke of the cam 33 to turn the ejection lever 35. The turn of the ejection lever 35 causes the receiving unit 2 to slide so as to carry out an ejection operation.

Finally, the entire operation of the disc changer will be described. The operations ① to ⑥ after the insertion of disc before the reproduction information recorded on the disc will be described in time sequence.

① With respect to the ejection operation, the playback cam driving motor 30 of the playback unit 5 is driven and the receiving unit 2 is moved forward relative to the base unit 1. The receiving unit 2 comes into contact with a front cover pivoted on an audio equipment to open the front cover, along with the movement of the receiving unit 2. In this state, a plurality of discs are received by an insertion operation of a user. The positional restriction lever 61 that is provided on the receiving unit restricts an insertion distance of the disc. When the disc is received in a prescribed position, the supporting member is fitted into the hole of the shutter so as to support the disc. Then, the receipt completion lamp lights up.

② After the disc is inserted, the playback unit-cam driving motor 30 of the playback unit 5 operates in the reverse direction to move the receiving unit 2 rearward relative to the base unit 1. The front cover of the audio equipment closes along with the rearward movement of the receiving unit 2.

③ With respect to the selection operation, the playback unit 5 swings in accordance with the user's instructions of selection of a certain disc and the transfer unit 6 moves upward to the position of the disc to be transferred. The positional restriction lever 61 for restricting the insertion distance of the disc swings along with the upward movement of the transfer unit 6 so that the disc can be transferred from the receiving unit 2 to the transfer unit 6.

④ With respect to the disc-loading operation, the drive of the transfer unit-driving motor 55 of the transfer unit 6 causes the pawl 57 to project from the transfer unit 6 so as to come into the positional determination opening 58 of the receiving unit 2. The further drive of the transfer unit-driving motor 55 causes the transfer lever 53 to engage with the fitting hole 60a of the disc, resulting in the withdrawal of the disc together with the transfer lever 53. The shutter engaging plate provided on the transfer unit 6 engages with the shutter during the withdrawal operation of the disc, to open the shutter. When the withdrawal of the disc is completed, the pawl 57 projecting from the transfer unit 6 withdraws from it. The leaf spring presses the disc downward. When the record on the disc is carried out, the further drive of the transfer unit driving motor 55 causes the magnetic head 23 to be pressed down. When only the reproduction of information recorded on the disc is carried out, the magnetic head 23 is kept in the withdrawal state without driving the transfer unit driving motor 55.

⑤ The drive of the playback unit-cam driving motor 30 causes the transfer unit to move down. The disc is placed on the turntable 4 of the playback unit 5. The further drive of the playback unit-cam driving motor 30 after completion of the decent operation of the transfer unit 6 causes the wedge portion 9 to project from the playback unit 5 so that the playback unit 5 and the transfer unit 6 is secured to the base unit 1.

⑥ Then, the turntable 4 of the playback unit 5 turns and the pickup 3 moves in the diametrical direction of the disc to carry out the reproduction of information recorded on the disc.

Now, description will be given below of an operation of discharging the disc after the completion of reproduction of information.

① The drive of the playback unit-cam driving motor 30 causes the wedge portion 9 to withdraw after the completion of the reproduction of information. The further drive of the playback unit-cam driving motor 30 causes the transfer unit 6 to move upward to the original position in which the disc has been received.

② With respect to the disc-unloading operation, the transfer unit driving motor 55 is driven after the completion of the moving operation of the transfer unit 6 to a prescribed position, with the result that the pressure of the leaf spring to the disc is released. The further drive of the transfer unit driving motor 55 causes the pawl 57 to project from the transfer unit 6 so that the transfer unit 6 engages with the receiving unit 2. The further drive of the transfer unit driving motor 55 causes the disc to move forward together with the transfer lever 53 so as to return the disc to the receiving unit 2. The supporting member engages with the hole of the shutter of the cartridge during the returning operation of the disc to the receiving unit 2, to close the shutter. The further drive of the transfer unit driving motor 55 causes the pawl 57 to withdraw from the transfer unit 6.

③ The drive of the playback unit-cam driving motor 30 causes the transfer unit 6 to move down. The further drive of the playback unit-cam driving motor 30 causes the wedge portion 9 to project from the playback unit 5 so that the transfer unit 6 and the playback unit 5 are secured to the base unit 1.

④ The further drive of the playback unit-cam driving motor 30 causes the ejection lever 35 to press the receiving unit 2 forward so as to carry out the election operation.

According to the present invention as described in detail, the disc changer of the present invention comprises: a receiving unit for receiving a plurality of discs; a base unit; a playback unit; and a transfer unit for transferring one of said plurality of discs to said playback unit, said transfer unit being movable in a vertical direction relative to said base unit, said playback unit has on its opposite ends swing support axes, said playback unit being swingable around said swing support axes relative to said base unit and said transfer unit, respectively, said playback unit having a gear; said base unit has a base unit-gear segment portion and said transfer unit has a transfer unit-gear segment portion, said gear being held between said base unit-gear segment portion and said transfer unit-gear segment portion so as to engage with these gear segment portions. Accordingly, the one end of the transfer unit is supported by engagement of the transfer unit-gear segment portion with the gear provided on the playback unit and the other end of the transfer unit is supported by one of the swing support axes of the playback unit. The swing of the playback unit relative to the base unit causes the transfer unit to move substantially linearly, while maintaining substantially the parallel posture of the transfer unit with the base unit. The selection operation can therefore be carried out by a simple structure.

The other disc changer of the present invention comprises: a receiving unit for receiving a plurality of discs; a base unit; and a transfer unit being movable in a vertical direction relative to said receiving unit, wherein: an ejection operation in which said receiving unit slides in a horizontal direction relative to said base unit and a selection operation in which said transfer unit moves in the vertical direction to a prescribed position of one of said plurality of discs are carried out by a single driving power source. Accordingly, the single driving power source for the ejection operation and the selection operation makes the structure of the disc changer simple. It is also possible to manufacture the disc changer in a smaller size.

What is claimed is:

1. A disc changer, comprising:

a receiving unit for receiving a plurality of discs;

a base unit;

a playback unit; and a transfer unit for transferring one of said plurality of discs to said playback unit, said transfer unit being movable in a perpendicular direction to said base unit;

wherein:

said playback unit has on its opposite ends swing support axes, said playback unit being swingable around said swing support axes relative to said base unit and said transfer unit, respectively, said playback unit having a gear;

said base unit has a base unit-gear segment portion and said transfer unit has a transfer unit-gear segment portion, said gear being held between said base unit-gear segment portion and said transfer unit-gear segment portion so as to engage with these gear segment portions.

2. A disc changer, comprising:

a single receiving unit having a plurality of trays for receiving a plurality of discs, said single receiving unit being movable in a horizontal direction and said plurality of trays being disposed apart from each other in a vertical direction;

a base unit;

a transfer unit being movable in a perpendicular direction to said receiving unit; and a single driving power source for (i) sliding said single receiving unit including said plurality of trays in a horizontal direction relative to said base unit during an ejection operation and (ii) moving said transfer unit to a prescribed position of one of said plurality of discs during a selection operation.

3. The disc changer as claimed in claim 1, wherein:

an ejection operation in which said receiving unit slides in a horizontal direction relative to said base unit and a selection operation in which said transfer unit moves to a prescribed position of one of said plurality of discs are carried out by a single driving power source.

4. The disc changer as claimed in claim 3, further comprising:

a cam device, which swings said playback unit relative to said base unit and slides said receiving unit in the horizontal direction relative to said base unit.

5. The disc changer as claimed in claim 4, wherein:

said playback unit has a wedge portion that is capable of projecting, said cam device causing said wedge portion to project to engage with said base unit so as to restrict a swing motion of said playback unit.

6. The disc changer as claimed in claim 1, wherein:

there is provided a pawl for maintaining a prescribed swing angle of said playback unit relative to said base unit so that an assembly operation can be carried out, while keeping said transfer unit substantially in parallel with said base unit.

7. The disc changer as claimed in claim 3, wherein:

there is provided a pawl for maintaining a prescribed swing angle of said playback unit relative to said base unit so that an assembly operation can be carried out, while keeping said transfer unit substantially in parallel with said base unit.

8. The disc changer as claimed in claim 4, wherein:

there is provided a pawl for maintaining a prescribed swing angle of said playback unit relative to said base unit so that an assembly operation can be carried out, while keeping said transfer unit substantially in parallel with said base unit.

9. The disc changer as claimed in claim 5, wherein:

there is provided a pawl for maintaining a prescribed swing angle of said playback unit relative to said base unit so that an assembly operation can be carried out, while keeping said transfer unit substantially in parallel with said base unit.

* * * * *